April 14, 1970    J. P. BLOMGREN    3,506,226
VIBRATION ISOLATING MOTOR BRACKET
Filed June 25, 1968
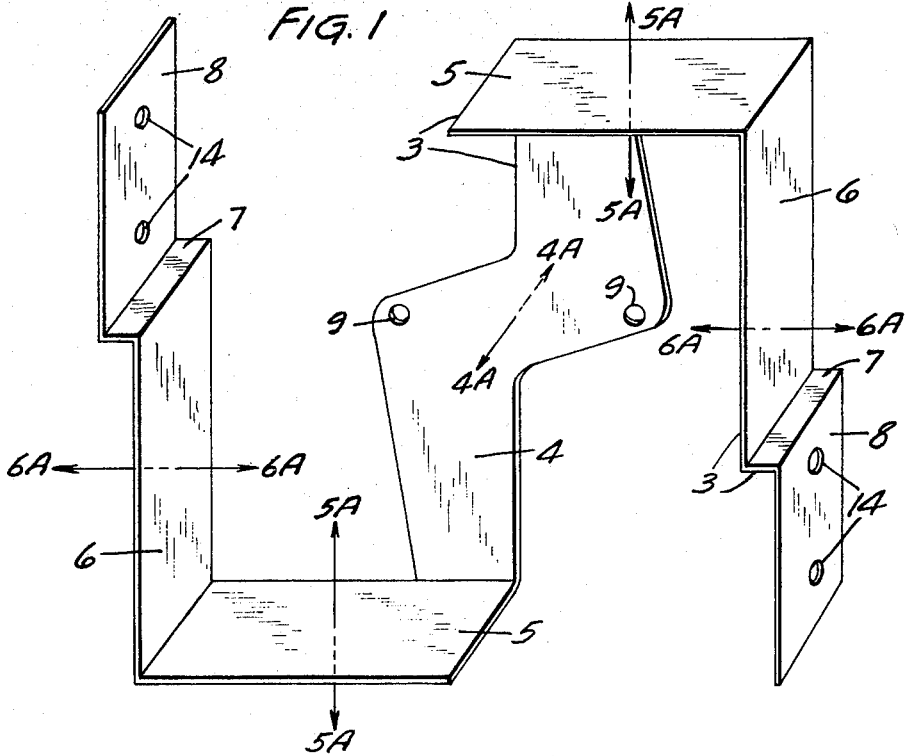
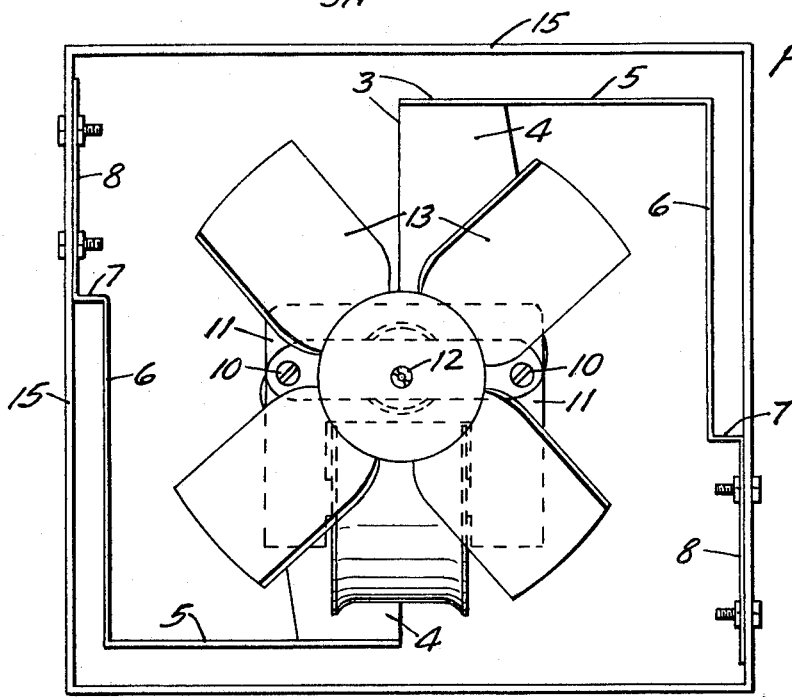
INVENTOR.
JACK P. BLOMGREN
BY Kinney Alexander,
Sell, Steldt & DeLaHunt
ATTORNEYS

United States Patent Office 3,506,226
Patented Apr. 14, 1970

3,506,226
VIBRATION ISOLATING MOTOR BRACKET
Jack P. Blomgren, Maplewood, Minn., assignor to Minnesota Mining and Manufacturing Company, St. Paul, Minn., a corporation of Delaware
Filed June 25, 1968, Ser. No. 739,693
Int. Cl. F16f *15/04, 15/00;* F04d *29/60*
U.S. Cl. 248—15     4 Claims

ABSTRACT OF THE DISCLOSURE

A vibration isolating motor bracket having strips of flexible material in the three principal planes to isolate from the supporting structure vibration of the motor in any direction.

---

This invention relates to an improved motor bracket for isolating from the supporting structure vibration caused by an unbalanced motor.

Methods for isolating vibration set up by motors are numerous and range from a piece of resilient material placed adjacent the motor housing to sophisticated sets of springs and damping devices for large machines. In most cases, however, where a motor is used, such as in electric fans, very little is done to isolate vibration of the motor from its surroundings. In some applications, however, such as the cooling fan of still picture projectors, vibration isolation of the motor is critical. Thus, generally the cooling fan of still picture projectors is secured in a case and the case has pieces of resilient material between its base and the projector housing to which it is secured. This method most effectively isolates vibration perpendicular to the base and it has been sufficient when only slightly unbalanced motors are used. It is not, however, sufficient for the degree of unbalance found in the greater percentage of the motors which are often used in competitive still projectors. These motors may exhibit a sufficient degree of vibration in any of the three principal planes even when resilient material is used to distort and cause blurring of the projected picture, thereby causing the projector to be rejected.

It is therefore, an object of the present invention to provide an inexpensive motor bracket that provides isolation of motor vibration in all three principal planes to prevent any undesirable degree of vibration of the motor from being transmitted to the structure to which the bracket is attached.

The present invention has the advantages desired of a vibration isolation motor bracket and comprises a supporting strip, means for securing a motor centrally to the supporting strip, a pair of connecting strips secured perpendicular to opposite ends of the supporting strip, a pair of isolating strips, one secured at each of the free ends of the connecting strips perpendicular to the plane of the supporting strip and the planes of the connecting strips, and means for retaining a portion of the free ends of the isolating strips with the supporting strip, the connecting strips and the unretained portions of the isolating strips suspended for free vibration.

The novel features and advantages of the present invention will become apparent after reading the following description which refers to the accompanying drawing wherein:

FIGURE 1 is a perspective view of a vibration isolating motor bracket made in accordance with the present invention; and FIGURE 2 is a plan view of the bracket supporting a fan motor and secured in a case.

The vibration isolating motor bracket, generally designated 3, constructed in accordance with the present invention comprises a motor supporting strip 4, a pair of connecting strips 5, a pair of isolating strips 6, a pair of linking strips 7, and a pair of mounting strips 8.

The motor bracket 3 is preferably formed of a resilient material such as spring steel or tempered aluminum so as to give the motor sufficient support while at rest and sufficient flexibility to vibrate with the motor. The bracket may be cut from a sheet of such material by stamping or blanking to produce an integral member with the strips formed as segments of the blank which are then bent to the preferred shape mechanically producing an inexpensive vibration isolating motor bracket practical for use in a picture projector.

The supporting strip 4 is generally Z shaped to give sufficient width at its center for apertures 9 through which bolts 10 from the fan motor or frame 11 may extend for securing the fan motor 11 to the supporting strip 4 with the axis of the motor shaft 12 perpendicular to the center of the supporting strip 4. The width decreases from the center to the ends to give additional flexibility to the supporting strip 4. The length of the supporting strip 4 is slightly greater than the diameter of a circle swept out by the fan blades 13. This length provides as great a flexible portion as possible without necessitating a material increase in the space required for the fan in a projector, in a shield or case 15 which must have dimensions greater than the diameter of the fan blades even without the bracket.

The connecting strips 5 are generally rectangular parallel strips. Each of the connecting strips 5 is attached along a portion of one of its edges to one end of the supporting strip 4. The connecting strips 5 lie on the same side of the supporting strip 4 and extend in opposite directions therefrom a distance from the centerline of the supporting strip 4 approximately equal to one-half the length of the supporting strip 4.

The isolating strips 6 are generally rectangular parallel strips. One isolating strip 6 extends from the end of each of the connecting strips 5. They extend perpendicular to the plane of the supporting strip 4 and the planes of the connecting strips 5 toward the plane of the connecting strip 5 opposite the one to which they are attached.

The linking strips 7 are short generally rectangular parallel strips perpendicular to the isolating strips used to offset the mounting strips 8 from the isolating strips 6. This affords a spacing of the isolating strips from any supporting surface to permit suspended free vibration of the strips.

The mounting strips 8 are generally rectangular parallel strips extending perpendicular to the linking strips 7 and parallel to the isolating strips 6. They have apertures 14 for bolting the bracket 3 to the case 15. The length of a mounting strip 8 is just sufficient to firmly attach the bracket to the case 15 while the combined length of an isolating strip 6 and a mounting strip 8 is substantially equal to the length of the supporting strip 4. This gives the isolating strip 6 as much length as possible to isolate vibration.

In use the mounting strips 8 are bolted to the inner walls of a case 15 so that the supporting strip 4, the connecting strips 5 and the isolating strips 6 are suspended and a motor 11 is bolted to the supporting strip 4 as seen in FIGURE 2. As seen in FIGURE 1, if the motor is unbalanced the supporting strip 4 will isolate vibration in direction 4A—4A, the connecting strips 5 will isolate vibration in direction 5A—5A and the isolating strips 6 will isolate vibration in the direction 6A—6A. Thus, vibration is isolated from the case 15 in all three principle directions while the natural damping provided by the material is sufficient to keep the fan shaft aligned with any orifice.

Having thus described the present invention with reference to a preferred embodiment, it will be understood that minor modifications may be made therein without departing from the spirit and scope of the invention.

What is claimed is:

1. A vibration isolating motor bracket comprising:
   a supporting strip,
   means for securing a motor centrally to said supporting strip,
   a pair of connecting strips disposed in spaced generally parallel planes perpendicular to the plane of said supporting strip and extending therefrom in opposite directions, one of said connecting strips being secured, along a portion of one of its edges, to each end of said supporting strip,
   a pair of isolating strips, one secured at each of the extended ends of said connecting strips, disposed in spaced generally parallel planes perpendicular to the plane of said supporting strip and to the planes of said connecting strips, and
   means for retaining a portion of the free ends of said isolating strips so that said supporting strips, said connecting strips and the unretained portions of said isolating strips are suspended for free vibration.

2. A vibration isolating motor bracket formed on an integral strip of a resilient material, said strip comprising:
   a supporting segment,
   a pair of connecting segments, one joined along a supporting segment, disposed in spaced generally parallel planes perpendicular to the plane of said supporting segment on the same side of said supporting segment and extending in opposite directions therefrom,
   a pair of isolating segments, one at each of the extended ends of said connecting segments, disposed in generally parallel planes perpendicular to the plane of said supporting segment and the planes of said connecting segments, each of said isolating segments extending toward the plane of said connecting segment opposite the one from which it extends,
   means for securing a motor centrally to said supporting segment on the same side thereof as said connecting segments, and
   means for retaining a portion of the free ends of said isolating segments so that said supporting segment, said connecting segments, and the unretained portion of said isolating segments are suspended for free vibration.

3. A vibration isolating bracket as recited in claim 2 wherein said means for retaining a portion of the free ends of said isolating segments comprises a continuation of said strip of a resilient material offset from the plane of said isolating strips away from said supporting segment and a supporting structure to which said offset segments are secured with said supporting segment, said connecting segments and said isolating segments suspended for free vibration.

4. A vibration isolating fan motor bracket formed of an integral strip of a resilient material, said strip comprising:
   a supporting segment of a length greater than the diameter of a circle swept out by the fan blades,
   a pair of connecting segments disposed in spaced generally parallel planes perpendicular to the plane of said supporting segment on the same side of said supporting segment and extending in opposite directions from the ends thereof, each said connecting segment having two ends and two edges, one edge of each said connecting segment joined adjacent one end to either end of said supporting segment, each of said connecting segments extending a distance from the centerline of said supporting segment generally one-half of the length of said supporting segment,
   a pair of isolating segments disposed in generally parallel planes perpendicular to the plane of said supporting segment and the planes of said connecting segments, one joined by an end at each of the extended ends of said connecting segments, each of said isolating segments extending toward the plane of said connecting segment opposite the one from which it extends,
   a pair of short linking segments, one joined by an end at each of the free ends of said isolating segments, disposed in generally parallel planes parallel to the planes of said connecting segments and extending away from each other,
   a pair of mounting segments, one joined by an end at each of the free ends of said linking segments, disposed in generally parallel planes parallel to and spaced from the planes of said isolating segments and extending in the same direction as said isolating segments,
   means for securing a fan motor centrally to said supporting segment on the same side thereof as said connecting segments with the axis of the motor shaft perpendicular to the center of said supporting segment, and
   means for retaining said mounting segments so that said supporting segment, said connecting segments and said isolating segments are suspended for free vibration.

References Cited
UNITED STATES PATENTS

| | | | |
|---|---|---|---|
| 2,615,620 | 10/1952 | Goettl | 248—15 X |
| 2,715,495 | 8/1955 | Bastian | 230—259 |
| 3,047,211 | 7/1962 | Hay | 230—259 X |
| 3,145,910 | 8/1964 | Jolly | 230—273 X |

ROY D. FRAZIER, Primary Examiner

J. F. FOSS, Assistant Examiner

U.S. Cl. X.R.

230—273; 248—18

UNITED STATES PATENT OFFICE
CERTIFICATE OF CORRECTION

Patent No. 3,506,226                      April 14, 1970

Jack P. Glomgren

It is certified that error appears in the above identified patent and that said Letters Patent are hereby corrected as shown below:

Column 3, line 28, after "a" insert -- portion of one of its edges at each end of said --; line 38, cancel "supporting segment and the planes of said".

Signed and sealed this 4th day of August 1970.

(SEAL)
Attest:

Edward M. Fletcher, Jr.
Attesting Officer

WILLIAM E. SCHUYLER, JR.
Commissioner of Patents